Patented Mar. 14, 1950

2,500,599

UNITED STATES PATENT OFFICE 2,500,599

CATALYTIC HYDROXYLATION OF OLEFINIC COMPOUNDS

Ingolfur Bergsteinsson, Torrance, and Theodore W. Evans and James R. Scheibli, Oakland, Calif., assignors to Shell Development Company, San Francisco, Calif., a corporation of Delaware No Drawing. Application December 19, 1944, Serial No. 568,936

14 Claims. (Cl. 260—635)

This invention relates to a catalytic process for effecting oxidation and/or hydroxylation of olefinic compounds. More particularly, the invention pertains to a practical and economical process for catalytically hydroxylating olefinic compounds so as to obtain valuable compounds containing hydroxyl groups.

According to the process of the invention, formic acid is employed to catalyze the reaction between an olefinic compound and hydrogen peroxide or an organic peroxide capable of yielding hydrogen peroxide or active peroxidic oxygen under the reaction conditions. It is known that the direct hydroxylation of olefinic double bonds has been effected through the use of such agents as potassium permanganate, concentrated persulfuric acid, or Caro's acid, its primary decomposition product, and various organic peracids. The literature also reveals the addition of hydroxyl radicals to unsaturated organic compounds catalytically by means of certain inorganic oxides, particularly osmium tetroxide. Apparently none of these methods has been applied commercially to any significant extent, because they are difficult and costly to operate and because their operation results in low yields of the desired polyhydroxy products. A major disadvantage of the methods of the prior art resides in the fact that the use of anhydrous materials is in many instances required. The process of the present invention, on the other hand, is performable in aqueous as well as non-aqueous media, is easily and cheaply operated, and is easily controlled to give high yields of the desired products.

The process of the invention is applicable to hydroxylation and/or oxidation of a broad class of olefinic compounds. Formic acid which is used as catalyst in the process is effective in catalyzing the reaction of hydrogen peroxide, or other organic peroxides which will be more particularly described hereinafter, with any compound containing an olefinic linkage between two carbon atoms, each of which carbon atoms has the two remaining valences satisfied by single-bonded direct linkage to separate atoms, and which compound contains no other elements than carbon, hydrogen, oxygen and halogen (fluorine, chlorine, bromine or iodine). Representative groups of such organic compounds are the olefins such as ethylene, propylene, the butylenes, the amylenes, the hexylenes, cetene and the like; the cyclic olefins such as cyclopentene, cyclohexene, methyl cyclopentene, ethyl cyclohexene and the like; the open chain and cyclic diolefins such as butadiene, the pentadienes, the hexadienes, cyclopentadiene, methyl cyclopentadiene, cyclohexadiene, and the like; the unsaturated halides, such as vinyl chloride, allyl chloride, allyl bromide, crotyl chloride, methallyl chloride and the like; the unsaturated alcohols such as allyl alcohol, crotyl alcohol, methyl vinyl carbinol, methallyl alcohol, ethallyl alcohol, and the like; the unsaturated ethers such as diallyl ether, dicrotyl ether, dimethallyl ether, allyly methyl ether, allyl ethyl ether, methallyl ethyl ether, crotyl propyl ether, allyl glyceryl ether, and the like, and the homologs and suitable substitution products of the listed compounds.

The olefinic compound employed as reactant in the process is seen from the foregoing description of representative compounds to be one containing the structure

each of the free bonds of which are linked to separate carbon atoms and which compound is composed of no other elements than carbon, hydrogen, oxygen and halogen. Excluded from the scope of this generic definition of suitable reactants are those olefinic compounds, like allene, butadiene-1,2, and ketene, which contain the structure

but which have the free bonds of one of the carbon atoms linked to the same atom rather than separate atoms. While suitable olefinic reactants have the free bonds of the essential structure

directly linked to separate atoms, those separate atoms can be of the same species as in the case, for example, with ethylene where the separate atoms are all hydrogen atoms or with tetramethylethylene where they are all carbon atoms; or those separate atoms can be of different species as with isobutylene where one of the olefinic carbon atoms of the essential structure has the remaining free bonds linked to separate hydrogen atoms and the other has the free bonds linked to separate carbon atoms or as with vinyl acetate where one has the free bonds linked to separate hydrogen atoms and one free bond of the other is linked to an oxygen atom while the other is linked to a hydrogen atom. The olefinic reactants can contain either a single essential olefinic structure

or a plurality of them. The latter case is exemplified by such compounds as butadiene-1,3, diallyl ether and ethylene glycol dicinnamate.

It is ordinarily preferred to utilize substantially pure compounds in the process of the invention, although mixtures of compounds can be employed if desired. For example, in manufacturing glycols, it is at times convenient and economical to employ a mixture of mono-olefins rather than a single mono-olefin. Thus, there can be used a mixture of hexylenes like hexylene-1, hexylene-2 and possibly hexylene-3 in manufacturing hexylene glycol with the process, such a mixture of hexylenes being obtainable by some of the known methods of chemically dehydrating secondary hexyl alcohol.

The process of the invention is of particular commercial value as applied to the direct catalytic hydroxylation of olefins to the corresponding glycols, of unsaturated alcohols to the corresponding saturated polyhydric alcohols, and of unsaturated monohalides to the corresponding saturated monohalohydrins. Excellent results are obtained in applying the process of the invention to production of trihydric alcohols by use of a mono-olefinic monohydric alcohol as reactant such as buten-1-ol-3, hexen-2-ol-4, oleyl alcohol and the like. A particularly preferred subgroup of the mono-olefinic monohydric alcohols are the beta,gamma-mono-olefinic monohydric alcohols (allyl-type unsaturated alcohols). Glycerol and substituted glycerols can be obtained from these alcohols. Thus, for example, allyl alcohol can be hydroxylated to glycerol, methyl vinyl carbinol (buten-1-ol-3) or crotyl alcohol can be hydroxylated to alpha-methyl glycerol, methallyl alcohol can be hydroxylated to beta-methyl glycerol, cinnamyl alcohol can be hydroxylated to alpha-phenyl glycerol, etc. Similarly, beta, gamma-mono-olefinic monohalides (allyl-type unsaturated halides) can be hydroxylated to halohydrins, i. e. allyl chloride can be hydroxylated to glycerol monochlorhydrin, allyl bromide can be hydroxylated to glycerol monobromhydrin, methyl vinyl carbinyl chloride or crotyl chloride can be hydroxylated to alpha-methyl glycerol chlorhydrin, methallyl iodide can be hydroxylated to alpha-methyl glycerol monoiodohydrin, etc.

The beta,gamma - mono - olefinic monohydric alcohols and beta,gamma-mono-olefinic monohydric halides contain a characteristic allylic grouping which has an olefinic linkage between two carbon atoms, one of which is directly linked to a saturated carbon atom having directly linked thereto the hydroxyl group or a single halogen atom. These compounds may be represented by the general formula

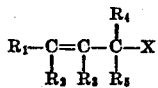

$R_1$, $R_2$, $R_3$, $R_4$ and $R_5$ representing hydrogen atoms, hydrocarbon radicals or halogen substituted hydrocarbon radicals, and X being a hydroxy group or a halogen atom. Representative radicals which $R_1$, $R_2$, $R_3$, $R_4$ and $R_5$ may represent are, for example, methyl, ethyl, propyl, butyl, tertiary butyl, amyl, secondary amyl, cyclopentyl, cyclopentenyl, cyclohexyl, benzyl, phenyl, substituted hydrocarbon radicals, such as the carbinol group, a chloromethyl group, a bromomethyl group, a chloroethyl group, and the like and their homologs.

In executing the process of the invention, any peroxidic compound capable of yielding free hydroxyl radicals or active peroxidic oxygen under the reaction conditions can be employed as the hydroxylating agent. Hydrogen peroxide is a comparatively cheap and readily available substance for this purpose and, because of excellent results obtainable therewith, is preferred. Other preferred materials are hydrocarbon peroxides resulting from the non-explosive incomplete oxidation of hydrocarbons like propane, butane, propylene, etc. This peroxidic material which is conveniently referred to as "hydrocarbon peroxides" or "propane peroxide" (when derived from propane) contains a large proportion of hydrogen peroxide together with varying amounts of hydrogen peroxide together with varying amounts of hydrogen peroxide combined with other materials as well as verying amounts of water, aldehydes, acids, esters, ketones, etc., the exact composition depending upon many factors. Propane peroxide is a particularly suitable material for use as hydroxylating agent and is obtained by subjecting propane to the action of oxygen for a short time at 400° C.–500° C., the ratio of oxygen to propane being of the order of about 1:9 volumes of gas. Details of methods of producing such hydrocarbon peroxides are described in copending applications of Lacomble, Serial Nos. 355,297-8, filed September 4, 1940, the former having now issued as U. S. Patent No. 2,376,257 and the latter having become abandoned. The hydrocarbon peroxides can be applied either alone or in conjunction with pure hydrogen peroxide and/or other suitable hydroxylating agents.

Among other suitable hydroxylating agents are diacyl peroxides like dibenzoyl peroxide, diacetyl peroxide, dilauryl peroxide, succinyl peroxide, difuroyl peroxide, etc., as well as acyl peracids like perbenzoic acid, peracetic acid, perfuroic acid, percamphoric acid, etc. Also suitable are such peroxidic compounds as ditertiary butyl peroxide, tertiary butyl hydroperoxide, lauryl peroxide, acetone peroxide and the like. The reaction can be conducted in aqueous solution with these organic peroxides which form hydrogen peroxide in situ under the reaction conditions. For convenience, the term "organic peroxides" is used in this application and in the appended claims to designate these substances.

Formic acid appears to be unique in catalyzing the reaction used in the process of the invention since the most closely related homolog, acetic acid, does not possess such catalytic activity. This is evident from results obtained in experiments wherein allyl alcohol was hydroxylated to glycerol. In the experiments, the conditions were identical except that in one no catalyst was added; in the second acetic acid was present; and in the third, formic acid was present. The hydrogen peroxide used in all the experiments was obtained by non-explosive incomplete oxidation of propane with oxygen. This was a liquid product containing free hydrogen peroxide as well as combined hydrogen peroxide. The combined hydrogen peroxide is believed to be primarily complex peroxidic compounds with formaldehyde and possibly higher aldehydes along with a minor proportion of alkyl hydroperoxides. The free hydrogen peroxide appears to be in equilibrium with combined hydrogen peroxide so that as the former is consumed, more free hydrogen peroxide is released from the latter. An analysis of the hydrogen peroxide source material used in each of the experiments showed it to be approximately 4.7 M. of free hydrogen peroxide and 13.6 M. of total hydrogen peroxide (free plus combined).

The free hydrogen peroxide is determined by placing a measured quantity of sample in 50 ml. of $H_2SO_4$ (10% by volume) and 5 ml. of a saturated ferrous ammonium sulfate solution is added. The mixture is heated as rapidly as possible to 60° C. and the ferric sulfate formed is titrated with a titanous chloride or standard strength. This method is specific to determination of free hydrogen peroxide.

The total peroxide (free and combined) is determined by placing a measured quantity of sample in mixture consisting of 100 cc. of 10% $H_2SO_4$ and about 2 gms. of KI. This is left in the dark for 15 minutes and then the iodine formed is titrated with standardized thiosulfate solution. This is a modification of the method of Kingzett, J. Chem. Soc., 1880 p. 792. It was used in following the course of the reaction as described hereinafter.

The hydroxylations were effected with the reactants in aqueous solution in 4 oz. glass bottles. The temperature was controlled by immersing the bottles in a constant temperature waterbath. During the experiments, samples were taken from time to time from the contents of the bottles to determine the extent of peroxide consumption and, at the end of the experiments, analyses were made so as to determine the conversion of allyl alcohol and yield of glycerol.

To determine the yield and conversion of glyceral, a 50 cc. portion of the reaction mixture was neutralized with 0.5 N sodium hydroxide and the neutralized mixture distilled to recover the unreacted allyl alcohol. The quantity of unreacted allyl alcohol was determined by conventional bromide-bromate titration.

The results obtained from the experiments are given in the tabulation:

| Acid added | None | Acetic | Formic |
| --- | --- | --- | --- |
| Concentration of materials, mols per Liter: | | | |
| Added Acid | 0.0 | 1.56 | 1.56 |
| Ally Alcohol | 1.56 | 1.56 | 1.56 |
| Total Hydrogen Peroxide (Free and Combined) | 1.95 | 1.95 | 1.95 |
| Extent of Reaction of Peroxide in: | | | |
| 1 day per cent | 3 | 3 | 24 |
| 5 days do | 14 | 16 | 71 |
| 18 days do | 60 | 67 | 98 |
| 21 days do | 86 | 91 | 99 |
| Percentage Conversion of Alcohol to Glycerol in 31 days | 51 | 54 | 58 |
| Percentage Yield of Glycerol in 31 days | 66 | 68 | 82 |

From the foregoing results, it is seen that added acetic acid has little, if any, effect in catalyzing the reaction since the course of the reaction is substantially the same as when no added acid was present, while the added formic acid has pronounced catalytic activity. Furthermore, added formic acid gives improved conversion and a decidedly superior yield of glycerol as compared to the use of no added acid or added acetic acid.

The manner in which the instant process is executed depends upon the nature of the compound being subjected to treatment. Preferably the reaction is conducted in dilute aqueous solution as a larger proportion of free hydroxy compound and less ester is thereby attained, but where the compound is insoluble in water or immiscible therewith, a non-aqueous medium may be employed. The reaction may also be conducted in a heterogeneous medium, wherein water may or may not be one of the components. The need for carrying out the reaction in a heterogeneous mixture may arise, for example, where the product must be discharged rapidly in order to obtain a completed reaction. This may be accomplished by employing as a component of the mixture material in which the product alone is insoluble. When reacting olefinic compounds which are normally insoluble in water, e. g. monoolefinic hydrocarbons, and desiring to effect the reaction in a homogeneous aqueous solution, the reactants and water can be formed into a homogeneous mixture by the use of a coupling solvent such as acetic acid, propionic acid or normal butyric acid. By using such acids, the olefin can be brought into a homogeneous aqueous solution which contains a considerable amount of water.

When it is necessary or desirable to conduct the reaction in a non-aqueous medium, the use of solvents that do not oxidize under the conditions of the reaction is preferred. A number of satisfactory solvents may be found among the saturated ethers and nitriles and the tertiary alcohols. A suitable anhydrous solution of hydrogen peroxide may be prepared, for example, by mixing 30% aqueous peroxide and tertiary butyl alcohol in the ratio 1:4, thereafter effecting stratification of a water and alcohol layer by the addition of a suitable salt such as anhydrous sodium or calcium sulfate and then concentrating the alcohol layer (containing 5-10% of the peroxide) after separation and further treatment with the sulfate, by vacuum distillation, preferably in all-glass apparatus. Another method whereby a suitable anhydrous solution of hydrogen peroxide may be prepared is by the azeotropic distillation under reduced pressure of a mixture consisting of one part aqueous hydrogen peroxide and two or three parts tertiary amyl alcohol. Anhydrous formic acid suitable for the purposes of the process may be obtained by the decomposition of dry sodium formate with concentrated sulfuric acid, or if only small quantities are required by the action of hydrogen sulfide on lead formate.

The process of the invention is performed by intimately mixing the principal reactants, namely the peroxide solution and compound to be hydroxylated with the acid catalyst. No particular order of mixing need be observed. The reaction is preferably permitted to continue until all or substantially all of the active oxygen is consumed, after which the reacted mixture is fractionally distilled or otherwise treated in order to separate volatile materials and the catalyst therefrom. The product is thereafter freed of esters, which are present in the greatest amount when the reaction has been conducted in concentrated aqueous solution or with anhydrous materials, by steaming, by catalyzed or uncatalyzed ester exchange or by any other suitable known method.

When the unsaturated organic compound to be treated is a gas, such as ethylene, the process may be executed in several ways. One method is to shake the peroxide, catalyst, and gas together under a gas pressure of any practical magnitude.

If desired, solubility enhancing agents, such as soaps, may be added to increase the quantity of gas going into solution. Another method is to pass a solution of the acid catalyst and peroxides counter-currently to the gas in a bubble plate or packed tower, the gas being made to enter the bottom of the tower and the catalyst-peroxide solution at the top. Such a tower may also be used when oxidizing liquids or dissolved or dispersed solids. However, for this purpose, an ordinary closed kettle type reactor provided with stirring and temperature control means and fitted with a reflux condenser, whereby vaporized materials are returned to the reaction zone has been found adequate.

The principal controlling factors which determine the course of the reaction are the temperature, ratio of peroxide to the unsaturated compound treated, the catalyst concentration and the extent of dilution of the reaction mixture. In general it has been found preferable to conduct the reaction at moderate temperatures in dilute solution, preferably a dilute aqueous solution, containing about 1 mol of catalyst for each mol of olefin, and with an excess of peroxide. Observance of these conditions usually produces the maximum conversion of olefin to hydroxy compound and the maximum yield based on the amount of reacted olefin. The exact temperature favoring the addition of hydroxyl radicals varies depending upon the material being subjected to treatment but, in general, operation within the range of from about 0° C. to 80° C. is preferred. It has been determined that higher operating temperatures, while providing a faster reaction rate, usually tend toward the formation of aldehydes, ketones, acids, and other oxidation products rather than hydroxy compounds. This fact should be heeded when it is desired to apply the process to effect the production of such compounds.

While the use of excess peroxides, that is, the use of a greater quantity of peroxide than is theoretically required to effect the desired hydroxylation is generally preferable as stated, this procedure is in no way critical. The only significant advantage resides in the fact that a greater quantity of olefin is thereby converted, the yield based on the amount of olefin reacted remaining substantially unaffected. The selection of the best ratio of peroxide to olefinic compound is largely a matter of experience, and depends upon the nature of the reactants. In general, olefinic compounds that react rapidly require less peroxide, while those that react slowly may require a considerable excess in order to complete the reaction. If hydrocarbon peroxides from the partial oxidation of hydrocarbons are used, larger amounts are generally needed. While unreacted olefin can usually be readily recovered by distillation, extraction, or other known methods, excess peroxide is usually not recoverable and may result in a further oxidation of the product. It should be here noted, however, that this effect can be ameliorated by killing the excess peroxide before recovering the unreacted olefin. This may be accomplished with finely divided manganese dioxide, finely divided carbon, hydroxylamine, hydrazine, or other suitable agents.

As to the effect of concentrated solutions, it has been observed that in solutions containing more than a total of ten mols of reactants and catalyst per liter, wherein the mol ratio of catalyst to olefin is of the order of 1:1 and the peroxide is present in excess, that both the amount of olefin converted to hydroxy compound and the yield are materially less than where more dilute solutions are employed.

Increasing the ratio of catalyst has been found to materially reduce the reaction time independently of the concentration of the solution, but since this procedure results in the conversion of less olefin, it is advantageous only where a rapid rate of reaction is considered of more importance than maximum conversion as in continuous operation involving the recycling of unreacted material.

The process of the instant invention has been found well adapted to the hydroxylation of allyl alcohol to glycerol, excellent yields being attained particularly when the preferred conditions as noted above are observed. The following table showing the results of tests conducted with allyl alcohol is introduced for the purpose of clarifying the foregoing observations:

*Oxidation of allyl alcohol to glycerol with propane peroxides*
[Effect of excess peroxide temperature, 40° C.]

| Conc. of Catalyst (Formic Acid), Mols/liter | Conc. of Alcohol, Mols/liter | Conc. of Peroxide, Mols/liter | Percent Excess Peroxide | Approx. Time in Days to React 95% of Peroxide | Percent Conv. of Alcohol to Glycerol | Percent Yield of Glycerol Based on Alcohol Reacted |
|---|---|---|---|---|---|---|
| 1.6 | 1.6 | 2.00 | 25 | 4 | 61.3 | 85.2 |
| 1.6 | 1.6 | 2.24 | 40 | 4 | 65.7 | 84.0 |
| 1.6 | 1.6 | 2.62 | 60 | 4 | 71.8 | 85.4 |
| 1.6 | 1.6 | 3.52 | 120 | 4 | 86.2 | 87.3 |
| 1.6 | 1.6 | 4.80 | 200 | 71% in 2 days | 73.8 | 74.2 |
| 3.70 | 3.70 | 4.61 | 25 | 70 hrs | 51.7 | 66.8 |
| 11.4 | 2.28 | 2.83 | 25 | 20 hrs | 48.8 | 70.7 |
| 8.0 | 1.6 | 2.00 | 25 | 30 hrs | 53.1 | 84.1 |

These tests were conducted in aqueous solution with formic acid and with "propane peroxides" as noted. In test five wherein a two hundred percent excess of peroxides was used, all but 0.6% of the alcohol reacted within two days, leaving approximately 29% of the peroxide unreacted. The lower yield in this case probably resulted from oxidation of part of the glycerol to other compounds such as glyceric acid. Some improvement in the conversion and yield followed, from dissipating the excess peroxides with manganese dioxide before recovering the unreacted alcohol, but even with his procedure the yield was less than in the preceding tests. It may therefore be concluded that under the conditions of the test, use of any greater excess of propane peroxides would be undesirable from the standpoint of maximum yield.

The following examples are introduced for the purpose of illustrating preferred modes of executing the invention. It is to be understood that the invention is not to be limited to the specific materials or conditions of operation disclosed.

*Example I*

A mixture comprising about 12 volumes allyl alcohol, about 7 volumes of 90% formic acid, about 60 volumes of water and about 32 volumes of an aqueous solution of peroxides obtained from the incomplete combustion of propane was maintained at a temperature of approximately 30° C. for ten days. At the end of this period 92% of the active oxygen was found consumed. The yield of glycerol, based on the reacted alcohol, was 82%.

*Example II*

To a reaction vessel containing about 1 mol of allyl alcohol was added a solution consisting of about 1 mol hydrogen peroxide and 1 mol of 90% formic acid dissolved in sufficient water to make up a total of about one liter of reaction mixture. After about 12 days, 99% of the peroxide was consumed and 80% of the allyl alcohol was oxidized to glycerol. The yield of glycerol based on the alcohol reacted was 95%.

*Example III*

The above experiment was repeated, the catalyst concentration being increased ten fold. In order to prevent loss of alcohol by evaporation, the reactor was cooled with ice. 83% of the peroxide was used in only four hours and 79% of the alcohol was converted to glycerol. The yield was 96%.

*Example IV*

An olefinic fraction of $C_{10}$ hydrocarbons obtained by thermally cracking wax and fractionating the product was used to prepare the corresponding glycol. The fraction had a boiling range of 169.5° C.–171.5° C., a density (20/4) of 0.75 and a bromine number of 64 gms. per 100 cc.

Two portions of about 25 cc. each were taken and about 19 cc. of 30 per cent aqueous hydrogen peroxide were added thereto along with about 10 cc. of formic acid to one. Both mixtures were then diluted to a total volume of approximately 500 cc. They were contained in glass flasks which were then placed in a constant temperature bath maintained at 60° C. Analyses were made at intervals of the peroxidic oxygen concentration contained in the reaction mixture and the results are tabulated below:

| Time from Start | Catalyst Present | |
|---|---|---|
| | None | Formic Acid |
| ½ hour | 0.735 N | 0.722 N |
| 1 day | 0.390 | 0.221 |
| 2 days | 0.113 | 0.066 |

After adding 50 per cent aqueous caustic in amount of about 60 per cent of theory, each mixture was steam distilled to remove paraffinic and unreacted olefinic hydrocarbons. In this manner, about 8 cc. of oil was recovered from the mixture containing no catalyst and about 7 cc. from the mixture containing the formic acid. The residue from each distillation was then neutralized with 50 per cent sodium hydroxide and extracted with 125 cc. portions of diisopropyl ether. The ether was then evaporated from the extract from the formic acid-containing mixture, and about 18 cc. of dark brown, viscous, oily glycol obtained. The mixture containing no catalyst gave about 16 cc. of like material.

*Example V*

A mixture totalling 300 cc. was prepared from 58 cc. of vinyl acetate, 44 cc. of water, 75 cc. of 30 per cent aqueous hydrogen peroxide and 123 cc. of acetic acid. This was divided into 3 parts and to one, 100 cc. of acetic acid was added while to another, 50 cc. of acetic acid and 50 cc. of 90 per cent formic acid was added. Each of the mixtures were contained in glass flasks and analyses were made at intervals to determine the concentration of peroxidic oxygen contained therein. The results of these analyses along with the calculated percentage of peroxide remaining are given in the following table.

| Catalyst Present | None | | Formic Acid | |
|---|---|---|---|---|
| Time from start | Conc. of peroxidic oxygen | Percentage of peroxide remaining | Conc. of peroxidic oxygen | Percentage of peroxide remaining |
| 1 hr | 2.5 N | 99 | 2.35 N | 94 |
| 19 hrs | 2.38 | 95 | 0.43 | 17 |
| 2 days | 2.08 | 83 | 0.30 | 12 |
| 17 days | 0.43 | 17 | 0.037 | 1.5 |

Upon testing the two reaction mixtures according to the method of Bertram and Rutgers (Rec. trav. chim., 57, 681 [1938]), the test indicated a compound with adjacent hydroxyl groups.

In a similar manner by the process of the invention, the following conversions to the indicated products are effected: ethylene to ethylene glycol; propylene to propylene glycol; isobutylene to isobutylene glycol; cetene to cetene glycol; pentene-2 to pentanediol-2,3; 2-methylbutene-1 to 2-methylbutanediol-1,2; trimethylethylene to trimethylethylene glycol; hexene-3 to hexanediol-3,4; styrene to phenyl glycol; cyclohexene to cyclohexanediol-1,2; diallyl to hexanetetrol-1,2,5,6; d-limonene to p-menthanetetrol-1,2,8,9; butadiene-1,3 to erythritol; cyclopentadiene to cyclopentanetetrol; methallyl alchohol to beta-methyl glycerol; methyl vinyl carbinol to alpha-methyl glycerol; methallyl chloride to beta-methyl glycerol monochlorhydrin; crotonic acid to dihydroxybutyric acid; cinnamic acid to phenylglyceric acid; maleic acid to mesotartaric acid; fumaric acid to racemic acid; anethole to p-methoxyphenyl-1-propanediol-1,2; eugenol to eugenol glycol; cholesterol to dihydroxy cholesterol; citronellol to 2,6-dimethyloctanetriol-1,2,8; oleic acid to 9,10-dihydroxystearic acid; linoleic acid to 9,10,12,13-tetrahydroxystearic acid; acrylic acid to glyceric acid; ethyl crotonate to ethyl dihydroxybutyrate; diethyl maleate to diethyl mesotartrate; dimethyl fumarate to dimethyl racemate; cinnamyl alcohol to phenylglycerol; cinnamic aldehyde to phenylglyceraldehyde; acrolein to glyceraldehyde; vinyl bromide to glycolaldehyde; mesityl oxide to 2-methylpentanediol-2,3-one-4; diallyl ether to diglycerol; divinyl ether to glycolaldehyde; and methallyl ether to dibeta-methyl glycerol ether.

The glycols realizable by the present invention are very valuable for use as solvents and in the preparation of other compounds having comparable commercial significance. The many uses for glycerol in industry, especially the cosmetic, pharmaceutical, and explosives industries, and the importance of ethylene glycol as a freezing point depressant, are well known.

While certain aspects of the invention have been described with particular reference to the hydroxylation of allyl alcohol to glycerol, and while this is admittedly one of the more important applications, no limitation thereto is intended, unless imposed by the appended claims wherein the term "peroxide" is to be understood as encompassing all substances capable of yielding hydrogen peroxide or actual peroxide oxygen under the operating conditions.

This application is a continuation-in-part of our copending application, Serial No. 430,072, filed February 9, 1942, and now abandoned.

We claim as our invention:

1. A process for the hydroxylation of a compound containing an olefinic linkage between two aliphatic carbon atoms, each of which carbon atoms has the two remaining valences satisfied by single-bonded linkage to separate atoms, and said compound containing no other elements than carbon, hydrogen, oxygen and halogen which comprises reacting said compound with hydrogen peroxide in the presence of formic acid.

2. A process for the hydroxylation of a compound containing the aliphatic structure

each of the free bonds of which are linked to separate atoms, and which compound is composed of no other elements than carbon, hydrogen, oxygen and halogen which comprises reacting the compound with hydrogen peroxide in the presence of formic acid, said reaction mixture being a homogeneous aqueous solution and said hydrogen peroxide being produced therein in situ under the reaction conditions from organic peroxides.

3. In a process of reacting hydrogen peroxide with a compound containing an olefinic linkage between two aliphatic carbon atoms, each of which carbon atoms has the two remaining valences satisfied by single-bonded linkage to separate atoms and said compound containing no other elements than carbon, hydrogen, oxygen and halogen, the step which comprises effecting the reaction with the reactants in the presence of formic acid.

4. A process for the production of a dihydric alcohol which comprises reacting hydrogen peroxide with a mono-olefinic hydrocarbon in the presence of formic acid.

5. A process for the production of a dihydric alcohol which comprises reacting hydrogen peroxide with a mono-olefinic aliphatic hydrocarbon in the presence of formic acid and sufficient acetic acid to provide a homogeneous reaction mixture.

6. A process which comprises reacting vinyl acetate with hydrogen peroxide in the presence of formic acid.

7. A process for the production of a trihydric alcohol which comprises reacting hydrogen peroxide with a mono-olefinic monohydric alcohol in the presence of formic acid.

8. A process for the production of glycerol which comprises reacting allyl alcohol with hydrogen peroxide in the presence of formic acid.

9. A process for the production of glycerol which comprises reacting in homogeneous aqueous solution allyl alcohol with hydrogen peroxide in the presence of formic acid.

10. A process for the production of glycerol which comprises reacting allyl alcohol with hydrogen peroxide in the presence of formic acid, the reaction mixture being a homogeneous aqueous solution and the hydrogen peroxide being formed therein in situ under the reaction conditions from hydrocarbon peroxides obtained by non-explosive incomplete oxidation of hydrocarbons.

11. A process for the hydroxylation of a compound containing an olefinic linkage between two aliphatic carbon atoms, each of which carbon atoms has the two remaining valences satisfied by a single bonded linkage to separate atoms and said compound containing no other elements than carbon, hydrogen, oxygen and halogen, which comprises reacting the compound with a molecular excess of hydrogen peroxide in the presence of about an equimolecular proportion of formic acid as catalyst measured with respect to the amount of the compound initially present in the reaction mixture.

12. A process for the hydroxylation of a compound containing an olefinic linkage between two aliphatic carbon atoms, each of which carbon atoms has the two remaining valences satisfied by a single bonded linkage to separate atoms and said compound containing no other elements than carbon, hydrogen, oxygen and halogen, which comprises reacting the compound with a molecular excess of hydrogen peroxide in the presence of about an equimolecular proportion of formic acid as catalyst measured with respect to the amount of the compound initially present in the reaction mixture, the reaction being effected at about 0° C. to 80° C. in aqueous solution not more dilute initially than a total of ten moles of reactants and catalyst per liter.

13. A process for the production of a trihydric alcohol which comprises reacting a monoolefinic aliphatic monohydric alcohol with a molecular excess of hydrogen peroxide at 0° C. to 80° C. in the presence of about an equimolecular proportion of formic acid as catalyst measured with respect to the amount of olefinic alcohol initially present in the reaction mixture, the reaction being effected in aqueous solution not more dilute initially than a total of 10 moles of reactants and catalyst per liter.

14. A process for the production of glycerol which comprises reacting allyl alcohol with a molecular excess of hydrogen peroxide at 0° C. to 80° C. in the presence of about an equimolecular proportion of formic acid as catalyst measured with respect to the amount of allyl alcohol initially present in the reaction mixture, the reaction being effected in aqueous solution not more dilute initially than a total of 10 moles of reactants and catalyst per liter.

INGOLFUR BERGSTEINSSON.
THEODORE W. EVANS.
JAMES R. SCHEIBLI.

REFERENCES CITED

The following references are of record in the file of this patent:

UNITED STATES PATENTS

| Number | Name | Date |
|---|---|---|
| 2,062,918 | Lawson | Dec. 1, 1936 |
| 2,138,917 | Grun | Dec. 6, 1938 |
| 2,304,064 | Scanlan et al. | Dec. 8, 1942 |

FOREIGN PATENTS

| Number | Country | Date |
|---|---|---|
| 449,060 | Great Britain | June 19, 1936 |

OTHER REFERENCES

Milas: "Jour. Am. Chem. Soc.," vol. 58, page 1303 (1936).